US011460348B2

(12) United States Patent
Li et al.

(10) Patent No.: US 11,460,348 B2
(45) Date of Patent: Oct. 4, 2022

(54) TEMPERATURE MEASURING METHOD AND DEVICE FOR INDUCTION COOKER, AND READABLE STORAGE MEDIUM

(71) Applicant: Foshan Shunde Midea Electrical Heating Appliances Manufacturing Co., Ltd., Foshan (CN)

(72) Inventors: Xiaohui Li, Foshan (CN); Zhao Wang, Foshan (CN); Shuai Wang, Foshan (CN); Wei Chen, Foshan (CN); Shaohua He, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 379 days.

(21) Appl. No.: 16/844,977

(22) Filed: Apr. 9, 2020

(65) Prior Publication Data

US 2020/0232854 A1 Jul. 23, 2020

Related U.S. Application Data

(63) Continuation of application No. PCT/CN2017/113711, filed on Nov. 30, 2017.

(30) Foreign Application Priority Data

Oct. 30, 2017 (CN) .......................... 201711052240.6

(51) Int. Cl.
*G01K 1/02* (2021.01)
*G01K 1/022* (2021.01)
(Continued)

(52) U.S. Cl.
CPC ............ *G01K 1/022* (2013.01); *H05B 1/0261* (2013.01); *H05B 6/062* (2013.01); *G01K 2207/02* (2013.01)

(58) Field of Classification Search
CPC combination set(s) only.
See application file for complete search history.

(56) References Cited

U.S. PATENT DOCUMENTS 5,471,974 A 12/1995 Wilke
2010/0181304 A1* 7/2010 Gutierrez ............... H05B 6/065
219/626

FOREIGN PATENT DOCUMENTS

CN 102226539 A 10/2011
CN 102538027 A 7/2012
(Continued)

OTHER PUBLICATIONS

Foshan Shande Midea Electrical Heating Appliances, Mfg Co. Ltd., International Search Report and Written Opinion, PCT/CN2017113711, dated Jul. 26, 2018, 9 pgs.

(Continued)

*Primary Examiner* — Lisa M Caputo
*Assistant Examiner* — Nasir U. Ahmed
(74) *Attorney, Agent, or Firm* — Morgan, Lewis & Bockius LLP

(57) ABSTRACT

An induction cooker includes a microcrystal panel and at least three temperature sensors scattered on a bottom surface of the microcrystal panel, and the induction cooker is configured to heat a container to be measured. The method includes: obtaining temperature data collected by the at least three temperature sensors and position data of each temperature sensor relative to the microcrystal panel; obtaining an actual position of the container on the microcrystal panel according to the temperature data and the position data; obtaining a preset temperature curve matching the induction cooker according to the temperature data, and extracting a peak value of the preset temperature curve; and calculating (Continued)

an actual temperature of the container to be measured according to the actual position and the peak value.

20 Claims, 5 Drawing Sheets

(51) Int. Cl.
*H05B 1/02* (2006.01)
*H05B 6/06* (2006.01)

(56) References Cited

FOREIGN PATENT DOCUMENTS

| CN | 202993293 U | | 6/2013 | |
|---|---|---|---|---|
| CN | 103913255 A | | 7/2014 | |
| CN | 103939961 A | * | 7/2014 | ............... F24C 7/08 |
| EP | 2693127 A1 | | 2/2014 | |
| JP | H 07249480 A | | 9/1995 | |
| JP | 2004111091 A | | 4/2004 | |
| JP | 2004139821 A | | 5/2004 | |
| JP | 2009211984 A | | 9/2009 | |
| JP | 2010165696 A | | 7/2010 | |
| JP | 2010170784 A | * | 8/2010 | ............. H05B 6/062 |
| JP | 2013062180 A | | 4/2013 | |
| JP | 2016157545 A | | 9/2016 | |
| JP | 2017107882 A | | 6/2017 | |

OTHER PUBLICATIONS

Foshan Shande Midea Electrical Heating Appliances, Mfg Co. Ltd., Extended European Search Report, EP17930987.7, dated Oct. 14, 2020, 7 pgs.
Foshan Shande Midea Electrical Heating Appliances, Mfg Co. Ltd., Communication Pursuant to Rules 70(2) and 70a(2), EP17930987.7, dated Nov. 3, 2020, 1 pg.
Foshan Shande Midea Electrical Heating Appliances, Mfg Co. Ltd., First Office Action, CN201711052240.6, dated Dec. 12, 2019, 9 pgs.
Notice of Reasons for Refusal, Japanese Patent Application No. 2020-523762, dated Feb. 19, 2021, 3 pgs.
Notification of Reason for Refusal, KR Application No. 10-2020-7008454, dated Mar. 8, 2021, 11 pgs.

* cited by examiner

TEMPERATURE MEASURING METHOD AND DEVICE FOR INDUCTION COOKER, AND READABLE STORAGE MEDIUM

RELATED APPLICATIONS

This application is a continuation of PCT/CN2017/113711, filed Nov. 30, 2017, which claims priority to Chinese Application No. 201711052240.6, filed Oct. 30, 2017, which are incorporated by reference herein in their entireties.

TECHNICAL FIELD

The present disclosure relates to the technical field of kitchen utensils, and in particular, to a temperature measuring method for an induction cooker, a temperature measuring device for the induction cooker, and a readable storage medium.

BACKGROUND

Nowadays, the temperature of the bottom of the container to be measured is normally measured by the temperature sensor positioned inside the induction cooker and spaced from the container through the microcrystal panel. Because the microcrystal panel is between the bottom of the container to be measured and the temperature sensor, there exists an air gap between the microcrystal panel and the bottom of the container to be measured, which results in a low synthetic thermal conductivity rate from the container to the microcrystal panel, and an incorrect temperature value measured by a single or multiple temperature sensors which are arranged unreasonably. As a result, the temperature sensor in the induction cooker on the market is mainly for protection, and cannot accurately measure the temperature of the container.

SUMMARY

The main objective of the present disclosure is to provide a temperature measuring method for an induction cooker, which aims to solve the problem that the temperature value cannot be accurately measured by measuring the temperature of the container to be measured in an induction cooker.

In order to achieve the above objective, the present disclosure provides a temperature measuring method for an induction cooker, the induction cooker including a microcrystal panel and at least three temperature sensors scattered on a bottom surface of the microcrystal panel, the induction cooker being configured to heat a container to be measured, the method including the following operations:

obtaining temperature data collected by the at least three temperature sensors and position data of each temperature sensor relative to the microcrystal panel;

obtaining an actual position of the container to be measured on the microcrystal panel according to the temperature data and the position data;

obtaining a preset temperature curve matching the induction cooker according to the temperature data, and extracting a peak value of the preset temperature curve; and calculating an actual temperature of the container to be measured according to the actual position and the peak value.

In some embodiments, the microcrystal panel being internally provided with a magnetic flux line, before the operation of "obtaining temperature data collected by the at least three temperature sensors and position data of each temperature sensor relative to the microcrystal panel", the method further includes:

determining the position data of each temperature sensor scattered on the bottom surface of the microcrystal panel of the induction cooker according to a coverage area of magnetic flux lines in the microcrystal panel of the induction cooker and number of temperature sensors.

In some embodiments, the operation of "determining the position data of each temperature sensor scattered on the bottom surface of the microcrystal panel of the induction cooker according to a coverage area of magnetic flux lines in the microcrystal panel of the induction cooker and number of temperature sensors" further includes:

determining a standard arc length of the temperature sensors spirally or concentrically distributed according to the coverage area of the magnetic flux lines in the microcrystal panel of the induction cooker and number of temperature sensors;

determining a radius of each of the temperature sensors spirally or concentrically distributed according to an initial radius, an initial angle and the standard arc length of each of the temperature sensors spirally or concentrically distributed; and determining an offset angle of each temperature sensor from the initial angle according to the calculated radius and the standard arc length of each temperature sensor, and using the radius and the offset angle of each temperature sensor as the position data of each temperature sensor scattered on the bottom surface of the microcrystal panel of the induction cooker.

In some embodiments, the operation of "determining the position data of each temperature sensor scattered on the bottom surface of the microcrystal panel of the induction cooker" includes:

the position data of each temperature sensor including the radius and the offset angle, and at least one difference value between the radii or the offset angles of the temperature sensors being greater than a preset dispersion interval.

In some embodiments, the operation of "obtaining a preset temperature curve matching the induction cooker according to the temperature data, and extracting a peak value of the preset temperature curve" includes:

obtaining a temperature value set according to the temperature data measured by the temperature sensors, and calculating a variance of the temperature value set; and comparing the variance of the temperature value set with a preset threshold, matching the variance with a hump curve according to a comparison result, and extracting the peak value of the hump curve.

In some embodiments, the operation of "comparing the variance of the temperature value set with a preset threshold, matching the variance with a hump curve according to a comparison result, and extracting the peak value of the hump curve" includes:

matching the variance with a preset first hump curve if the variance of the temperature value set is greater than or equal to a first preset variance value;

matching the variance with a preset second hump curve if the variance of the temperature value set is less than the first preset variance value and no less than a second preset variance value; and matching the variance with a preset third hump curve if the variance of the temperature value set is less than the second preset variance value, and the first preset variance value is greater than the second preset variance value.

In some embodiments, the operation of "obtaining an actual position of the container to be measured on the microcrystal panel according to the temperature data and the position data" includes:

obtaining top three maximum values from the temperature data, and calculating the actual position of the container to be measured on the microcrystal panel according to the position data of the temperature sensor and a corresponding mathematical relationship.

In some embodiments, the operation of "calculating an actual temperature of the container to be measured according to the actual position and the peak value" includes:

calculating the actual temperature of the container to be measured according to the actual position and the peak value, and obtaining a preset temperature correction coefficient corresponding to the actual temperature; and calculating the actual temperature of the container to be measured according to the peak value and the preset temperature correction coefficient.

Besides, in order to achieve the above objective, the present disclosure also provides a temperature measuring device, including a memory, a processor, a temperature measuring program for an induction cooker stored on the memory and executable on the processor, the program, when executed by the processor, implements the operations as described above.

Besides, in order to achieve the above objective, the present disclosure also provides a computer readable storage medium. The computer readable storage medium stores a temperature measuring program for an induction cooker, the program, when executed by a processor, implements the operations as described above.

The present disclosure provides a temperature measuring method for an induction cooker. The temperature of the bottom of the container to be measured can be accurately obtained under various conditions, such as the container to be measured is offset, by distributing the temperature sensors in a specific multi-point distribution manner. The temperature vector is formed by the temperature data set measured by the temperature sensors, and the peak value is obtained through the hump curve corresponding to the temperature vector, and then the actual position of the container to be measured is obtained through multiple maximum data in the temperature vector. Thus, the temperature correction coefficient is obtained by looking up the table. Finally, the actual temperature of the container to be measured is calculated according to the peak value and the temperature correction coefficient. The electromagnetic compatibility of the switching circuit is improved by controlling the frequency of the switching circuit. The present disclosure only changes the distribution mode of the temperature sensors, such that the temperature sensors can still accurately obtain the effective temperature of the bottom of the container to be measured under various conditions such as the container to be measured is offset, and finally calculate the actual temperature of the container to be measured. The present disclosure has the advantages of low implementation difficulty, accurate calculation results, and adaptability to various position situations such as the offset of the container to be measured.

The realization of the objective, functional characteristics, advantages of the present disclosure are further described with reference to the accompanying drawings.

DETAILED DESCRIPTION OF THE EMBODIMENTS

It should be understood that the specific embodiments described herein are only used to explain the present disclosure and are not intended to limit the present disclosure.

Figure 1:
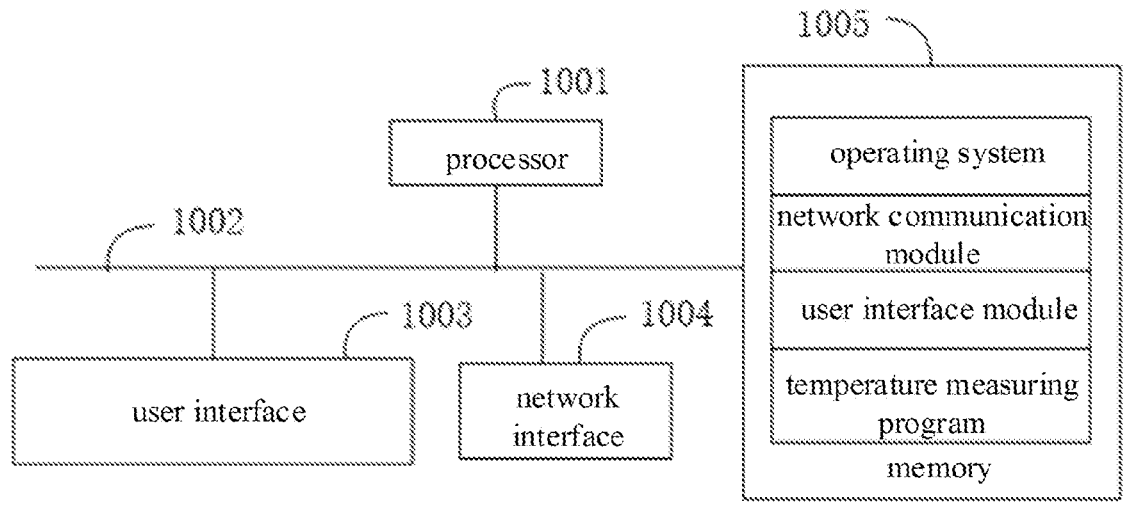
FIG. 1 is a schematic structural diagram of a terminal device in a hardware operating environment according to an embodiment of the present disclosure.

As shown in FIG. 1, FIG. 1 is a schematic structural diagram of a terminal in a hardware operating environment according to an embodiment of the present disclosure.

In some embodiments of the present disclosure, the terminal may be a smart kitchenware, or a mobile terminal device with a display function, such as a smart phone, a tablet computer, an e-book reader, an MP3 (Moving Picture Experts Group Audio Layer III) player, an MP4 (Moving Picture Experts Group Audio Layer IV) player, and a portable computer.

As shown in FIG. 1, the terminal may include a processor 1001, such as a CPU, a network interface 1004, a user interface 1003, a memory 1005, and a communication bus 1002. The communication bus 1002 is configured to implement connection and communication between these components. The user interface 1003 may include a display, an input unit such as a keyboard. The user interface 1003 may optionally include a standard wired interface and a wireless interface. The network interface 1004 may optionally include a standard wired interface and a wireless interface (such as a WI-FI interface). The memory 1005 may be a high-speed random access memory (RAM) memory or a non-volatile memory, such as a magnetic disk memory. The memory 1005 may optionally be a storage device independent of the foregoing processor 1001.

Optionally, the terminal may also include a camera, an RF (Radio Frequency) circuit, a sensor, an audio circuit, a Wi-Fi module, and so on. The sensors may be, for example, a light sensor, a motion sensor, and other sensors. Specifically, the light sensor may include an ambient light sensor and a proximity sensor. The ambient light sensor may adjust the brightness of the display according to the brightness of the ambient light. The proximity sensor may turn off the display and/or the backlight when the mobile terminal is moved to the ear. A gravity acceleration sensor, as a kind of motion sensor, may detect the magnitude of acceleration in various directions (usually three axes). The gravity acceleration sensor may detect the magnitude and direction of gravity when it is stationary, and may be configured to identify the gesture of the mobile terminal (such as horizontal and vertical screen switching, related games, magnetometer attitude calibration), vibration recognition related functions (such as pedometer, tap), etc. Of course, the mobile terminal may also be configured with other sensors such as a gyroscope, a barometer, a hygrometer, a thermometer, an infrared sensor, and the like, which will not be repeated here.

Those skilled in the art should understand that the terminal structure shown in FIG. 1 does not constitute a limitation on the terminal, and may include more or fewer components than shown in the figure, or a combination of some components, or a different arrangement of components.

As shown in FIG. 1, the memory 1005 as a computer storage medium may include an operating system, a network communication module, a user interface module, and a temperature measuring program for an induction cooker.

In the terminal shown in FIG. 1, the network interface 1004 is mainly configured to connect to a background server and perform data communication with the background server. The user interface 1003 is mainly configured to connect to a client (user) and perform data communication with the client. The processor 1001 may be configured to call the temperature measuring program for the induction cooker stored on the memory 1005, and perform the following operations:

obtaining temperature data collected by at least three temperature sensors scattered on a bottom surface of a microcrystal panel of the induction cooker and position data of each temperature sensor relative to the microcrystal panel;

obtaining an actual position of the container to be measured on the microcrystal panel according to the temperature data and the position data;

obtaining a preset temperature curve matching the induction cooker according to the temperature data, and extracting a peak value of the preset temperature curve; and calculating an actual temperature of the container to be measured according to the actual position and the peak value.

Further, the processor 1001 may call the temperature measuring program for the induction cooker stored on the memory 1005 and perform the following operations:

determining a standard arc length of the temperature sensors spirally or concentrically distributed according to the coverage area of the magnetic flux lines in the microcrystal panel of the induction cooker and number of temperature sensors;

determining a radius of each of the temperature sensors spirally or concentrically distributed according to an initial radius, an initial angle and the standard arc length of each of the temperature sensors spirally or concentrically distributed; and determining an offset angle of each temperature sensor from the initial angle according to the calculated radius and the standard arc length of each temperature sensor, and using the radius and the offset angle of each temperature sensor as the position data of each temperature sensor scattered on the bottom surface of the microcrystal panel of the induction cooker.

Figure 2:
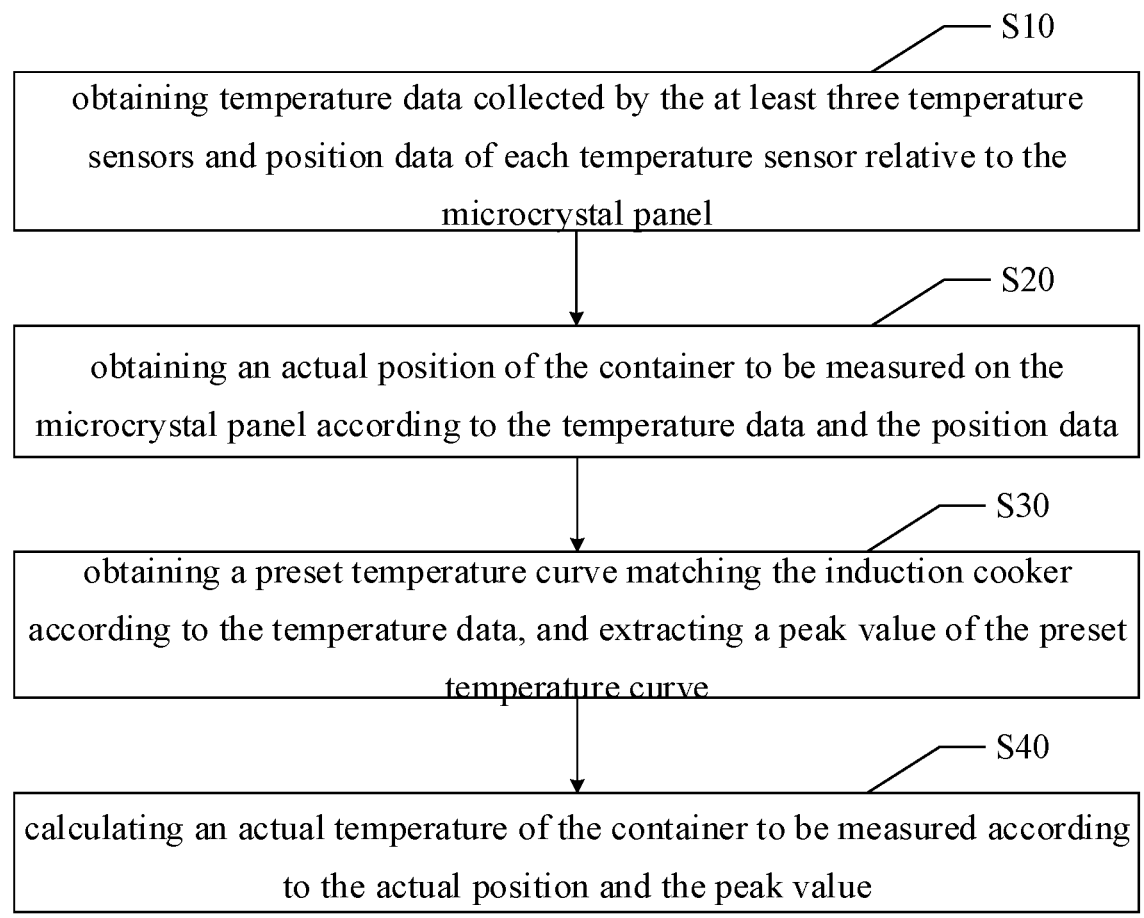
FIG. 2 is a schematic flowchart of a temperature measuring method for an induction cooker according to an embodiment of the present disclosure.

Referring to FIG. 2, FIG. 2 is a schematic flowchart of a temperature measuring method for an induction cooker according to a first embodiment of the present disclosure, the method including the following operations:

Operation S10, obtaining temperature data collected by at least three temperature sensors scattered on a bottom surface of a microcrystal panel of the induction cooker and position data of each temperature sensor relative to the microcrystal panel;

Operation S20, obtaining an actual position of a container to be measured on the microcrystal panel according to the temperature data and the position data;

Operation S30, obtaining a preset temperature curve matching the induction cooker according to the temperature data, and extracting a peak value of the preset temperature curve; and Operation S40, calculating an actual temperature of the container to be measured according to the actual position and the peak value.

Specially, in the present disclosure, a plurality of temperature sensors are installed at the bottom of the microcrystal panel of the induction cooker, and the present disclosure requires temperature data measured by at least three temperature sensors and position data distributed at the bottom of the microcrystal panel to complete all calculations. The temperature data measured by the temperature sensors at the position (the closer the position, the higher the measured temperature) where the bottom of the container to be measured contacts the microcrystal panel is greater than the temperature data measured by the temperature sensors at other positions. Therefore, the position of the temperature sensor with the maximum measured temperature data is the position of the bottom of the container to be measured. The actual position of the container to be measured on the microcrystal panel can be accurately obtained through at least three temperature sensor positions at the bottom of the container to be measured (a circle can be determined by three points on the circumference). Then, according to the variance of all temperature value sets, the corresponding hump curve (that is, the temperature lattice curve) is matched, and the peak data of the hump curve is obtained. Finally, the temperature correction coefficient is obtained according to the obtained actual position look-up table, and then the actual temperature of the container to be measured is calculated through the temperature correction coefficient and the peak data.

An induction cooker is a heating tool that uses the LC resonance (L is the inductance and C is the capacitance) to generate alternating electromagnetic fields to cut the magnetically permeable container to generate eddy current, such that the magnetically permeable container is heated. In the use of kitchen supplies, the induction cooker has replaced the kitchen supplies that are heated by fuel to a certain degree, such as traditional cookers, and thus become an important member of the kitchen supplies. The induction cooker has many advantages over the traditional stove that uses fuel, for example, the use of more environmentally friendly clean energy (electricity and greenhouse gas that does not produce combustion products), no open flames during use (the risk of fire is greatly reduced), and easier control during use. The induction cooker is capable of real-time monitoring of temperature data during use, which is one of the reasons why the induction cooker is more convenient to use. The induction cooker structure of the present disclosure is that the container to be measured is located and in contact with the microcrystal panel, and the coil disk is located below the microcrystal panel. There exists a gap between the microcrystal panel and the bottom of the container to be measured, and the temperature sensor is located at the bottom of the microcrystal panel and is in contact with the microcrystal panel.

However, in the related art, the temperature of the bottom of the container to be measured is normally measured by the temperature sensor positioned inside the induction cooker and spaced from the container through the microcrystal panel. Meanwhile, since the bottom of the container to be measured will generally have a certain degree of pre-degeneration (with the effect of making each part of the container to be heated more uniform), there exists an air gap between the microcrystal panel and the bottom of the container to be measured, which results in a low synthetic thermal conductivity rate from the container to the microcrystal panel, and an incorrect temperature value measured by a single or multiple temperature sensors which are arranged unreasonably (the temperature measured by the temperature sensor on different circles on the microcrystal panel with the center of the bottom of the container to be measured is different). As a result, the temperature sensor in the induction cooker on the market is mainly for protection, and cannot accurately measure the temperature of the container.

Figure 5:
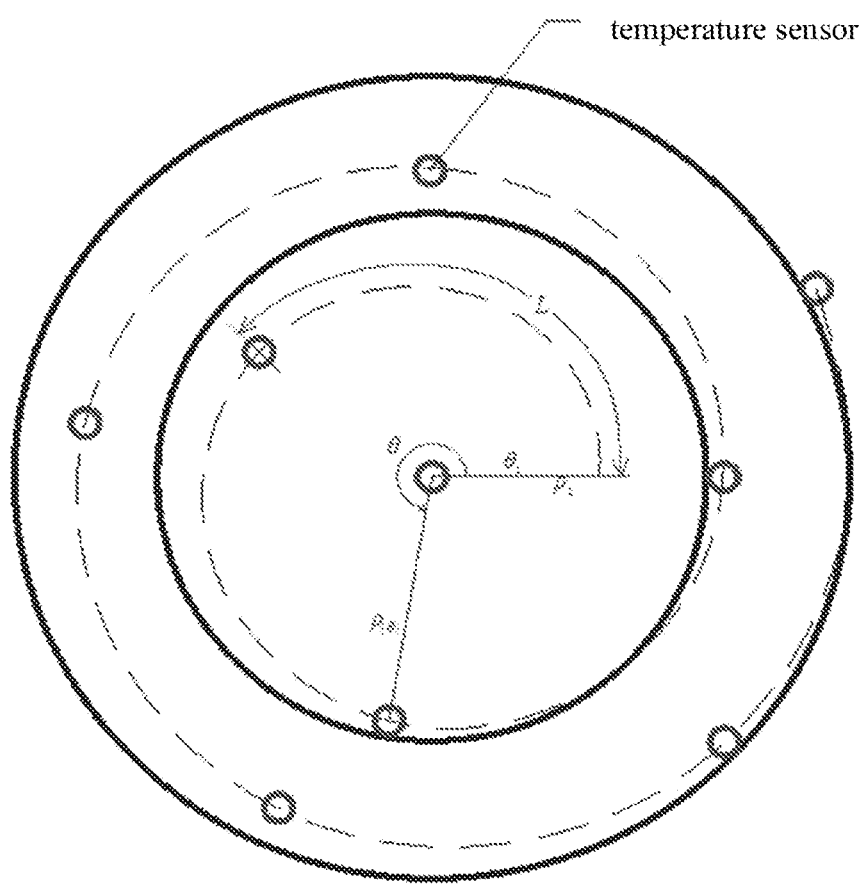
FIG. 5 is a schematic diagram of temperature sensors spirally distributed in the temperature measuring method for the induction cooker according to the present disclosure.

The temperature measuring method of the present disclosure is improved. The temperature sensor uses a multi-point distribution method such as a spiral distribution (a schematic diagram of the spiral distribution is shown in FIG. 5). The spiral distribution of the present disclosure can ensure that a certain number of temperature sensors are still in the position where the bottom of the container to be measured contacts the microcrystal panel under abnormal conditions such as offset of the position of the container to be measured, that is, the maximum value of temperature data can be measured. However, other multi-point distribution method such as concentric circle can also achieve the effect. However, for example, while the spiral distribution method achieves the effect, the number of distribution points required is far less than the multi-point distribution of other methods. Therefore, the spiral distribution is used for explanation, and it is applicable to other multi-point distribution methods that can ensure the maximum value of measured temperature.

In the present disclosure, the spiral distribution of the temperature sensors (select the circle with the highest magnetic flux line density in the plane of the microcrystal panel of the induction cooker, and calculate the arc length based on the radius of the circle and the number of temperature sensors distributed on the circle) uses an equal arc length distribution method, with the coil center as the spiral center (the coil center is also a distribution point for temperature sensing), and the initial radius and initial angle are set based on the basic data of different induction cookers (such as the size of the microcrystal panel). According to the formula, the angle of each point and spiral radius are calculated, so that the temperature sensors are distributed on the microcrystal panel. The spirally distributed temperature sensors make it possible for three or more temperature sensors to be located below the bottom of the container to be measured, regardless of the position of the microcrystal panel. In this way, the actual position of the container to be measured can be accurately obtained (in mathematics, a circle can be determined by three points on the circumference). After the actual position of the container to be measured is obtained, the temperature correction coefficient of the position is obtained by looking up the table, thereby further calculating the actual temperature of the container to be measured.

Figure 6:
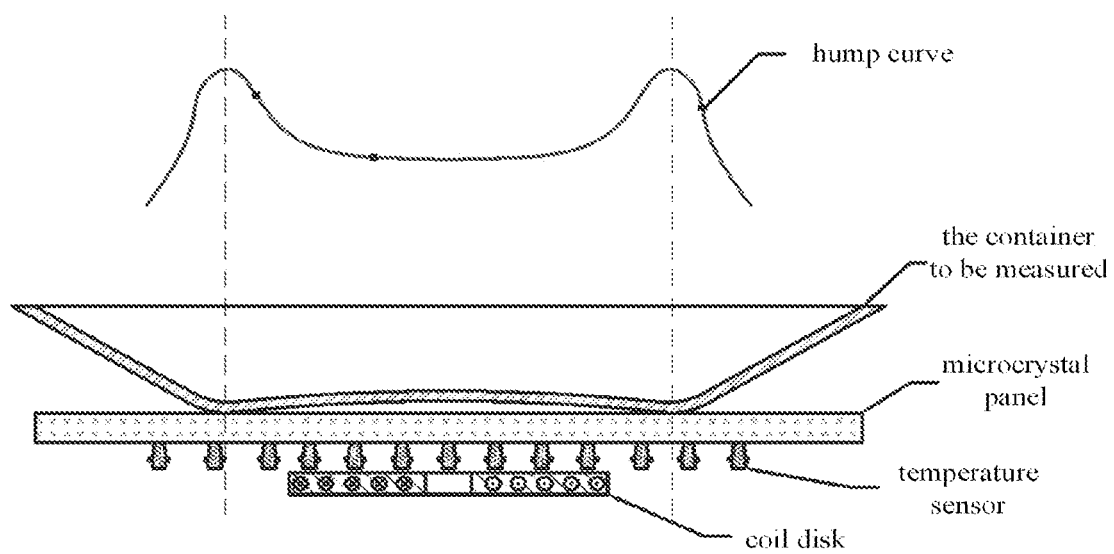
FIG. 6 is a schematic diagram of a hump curve in the temperature measuring method for the induction cooker according to the present disclosure.

In the present disclosure, first, the variance of the temperature data measured by all temperature sensors is calculated to determine whether the container to be measured is biased (if the bias occurs, the variance becomes larger). Then, according to the offset degree of the container to be measured, the corresponding hump curve is matched (the temperature dot matrix curve made by the data measured by each temperature sensor is called the hump curve, and the schematic diagram of the hump curve is shown in FIG. 6).

The hump curve at different positions will also change to a certain extent. The offset will cause the humps of the hump curve to be closer. The peak data can be obtained based on the measured temperature data and the hump curve. By calculating the temperature correction coefficient and the peak data of the hump curve using a preset calculation formula, the actual temperature of the container to be measured can be calculated more accurately.

In the present disclosure, first, the configuration of the temperature sensor is changed. The temperature sensor is configured by spiral distribution. After the temperature sensor is spirally distributed, no matter whether the container to be measured is offset or not, three or more temperature sensors can be ensured below the bottom of the container when the temperature is measured (According to the distributed temperature sensors, the number below the bottom of the container to be measured will also change accordingly, but it is at least three. In the present embodiment, three are used as examples). However, the temperature data measured by the temperature sensor below the bottom of the container to be measured will also be higher than other temperature sensors, so the actual position of the container to be measured can be obtained according to the hump curve (that is, the temperature dot matrix curve measured by the temperature sensor). After the actual position of the container to be measured is obtained, the actual temperature of the container to be measured is calculated according to the temperature correction coefficient corresponding to the peak data of the hump curve and the actual position.

The present disclosure provides a temperature measuring method for an induction cooker. The temperature sensor is spirally distributed, such that the temperature sensor can measure the temperature of the container to be measured more accurately, and can be applied to the container to be measured at more different positions, in order to deal with the situation where the container to be measured is offset. The accurate temperature of the container to be measured can help the user more flexibly grasp the timing of cooking, and also ensure the safety of the user when using the induction cooker without additional costs, which improves the user experience.

Further, according to an embodiment of the present disclosure, before operation S10, the method further includes:

Operation S11, determining the position data of each temperature sensor scattered on the bottom surface of the microcrystal panel of the induction cooker according to a coverage area of magnetic flux lines in the microcrystal panel of the induction cooker and number of temperature sensors.

Specially, the coverage area of the magnetic flux lines in the microcrystal panel of the induction cooker is the effective heating range, and the temperature sensors are distributed in the effective heating range, and the positions of the temperature sensors are determined according to the number of temperature sensors and the effective heating range.

When distributing the position of the temperature sensor, a center point is first determined and the center point is the geometric center of the microcrystal panel. The temperature sensor uses the center point as a reference (the center point may not be set or the center point is not set at the geometric center of the microcrystal panel). According to the difference of the offset angle and the radius, the temperature sensors are respectively distributed at the points of the microcrystal panel, and the difference between the distribution points is actually the difference of the offset angle and the radius. Generally, the increase of the offset angle and the radius is a regular change, but it can also be an irregular change according to the actual situation or different needs. The ultimate goal of the distribution of temperature sensors is to cover as much as possible the effective heating range. In the present disclosure, the offset angle and radius is adjusted, thereby ensuring that the temperature sensor can measure the effective temperature at which the bottom of the container to be measured is in contact with the microcrystal panel under the condition that the container to be measured is offset.

Figure 3:
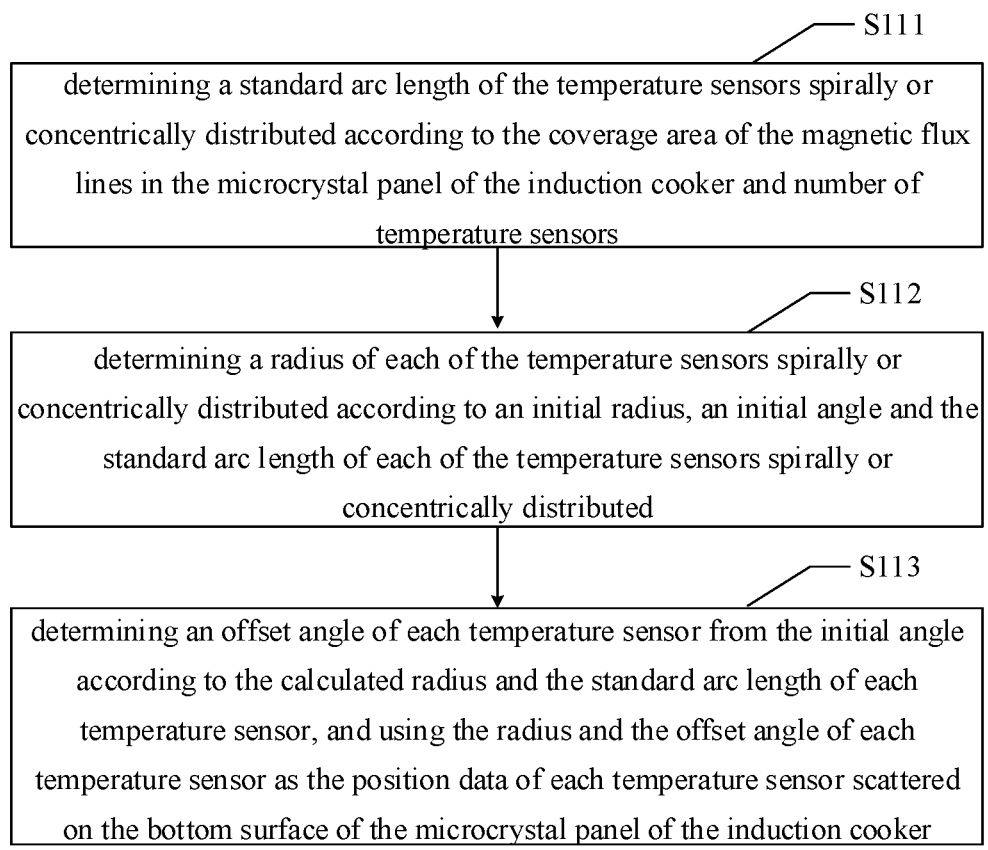
FIG. 3 is a detailed flowchart of operation S10 of the temperature measuring method for the induction cooker according to an embodiment of the present disclosure.

Further, as shown in FIG. 3, operation S11 includes:

Operation S111, determining a standard arc length of the temperature sensors spirally or concentrically distributed according to the coverage area of the magnetic flux lines in the microcrystal panel of the induction cooker and number of temperature sensors;

Operation S112, determining a radius of each of the temperature sensors spirally or concentrically distributed according to an initial radius, an initial angle and the standard arc length of each of the temperature sensors spirally or concentrically distributed; and Operation S113, determining an offset angle of each temperature sensor from the initial angle according to the calculated radius and the standard arc length of each temperature sensor, and using the radius and the offset angle of each temperature sensor as the position data of each temperature sensor scattered on the bottom surface of the microcrystal panel of the induction cooker.

Specially, the temperature sensors are spirally or concentrically distributed, the various parameters should be obtained. In the present disclosure, the spiral distribution is an equal arc length distribution. The arc length of each temperature sensor spirally distributed is calculated according to the radius of the circle with the largest magnetic flux line density in the plane of the microcrystal panel of the induction cooker and the number of temperature sensors distributed on the circle. The spiral radius of a point can be calculated based on data such as the initial spiral radius and the initial angle. Finally, according to the radius and standard arc length of each sensor, the offset angle of the temperature sensor from the initial angle is determined.

The radius of the circle with the largest magnetic flux line density in the plane of the microcrystal panel of the induction cooker is r, and there are m temperature sensors distributed on the circle. Then, the arc length between two temperature sensors is $L=2\pi r/m$. $\pi$ is the circumference ratio, in the present disclosure, $r=55$ mm, $m=3$, The arc length of each temperature sensor spirally distributed can be obtained through the formula.

With the center of the coil as the center of the spiral, $\rho_1$ as the initial radius of the spiral, and $\theta_1$ as the initial angle of the spiral, the formula for calculating the spiral radius corresponding to each point on the spiral is $\rho(\theta)=\lambda(\theta-\theta_1)+\rho_1$. In the present disclosure, $\rho_1=40$ mm, $\theta_1=0$. The spiral radius and spiral angle at the center of the spiral are $\rho_0=0$ and $\theta_0=0$. The number of turns is C. The number of turns is $C=2$, and the maximum spiral radius $\rho_{max}=100$. $\lambda$ is calculated according to the formula $\rho(\theta)=\lambda(\theta-\theta_1)+\rho_1$, and in the present disclosure, $\lambda$, is 4.7746.

Finally, according to the obtained initial radius and initial angle, and the coefficient $\lambda$, the position data of each temperature measuring point can be calculated one by one. According to the calculated k value and the spiral radius $\rho(\theta)$, it is calculated by integration: $L=\int_{\theta_n}^{\theta_{s+1}}(\lambda(\theta-\theta_1)+\rho_1)d\theta$. $L=2\pi r/m$. The two equations are simultaneously connected to obtain the relationship between the angle of the (n+1)th temperature measuring point and the angle and radius of the (n)th temperature measuring point, and n is a positive integer.

$$\theta_{n+1} = \frac{-\rho_1 + \sqrt{\rho_1^2 + \lambda(\lambda\theta_n^2 + 2\rho_1\theta_n + 4\pi r/m)}}{\lambda}$$

$\theta_n$ is calculated by one iteration. The specific position of each point is determined according to the calculated $\theta_n$ and $\rho(\theta)$. In the same way, position data of other distribution methods such as concentric circles can be calculated.

In the present disclosure, the temperature sensors are spirally or concentrically distributed. However, the specific distribution position needs to be determined through rigorous calculations to ensure that the temperature sensors can be accurately distributed on the corresponding spiral line. Therefore, the method for measuring the temperature for calculating the temperature of the container to be measured can also be performed normally.

Further, operation S11 further includes:

Operation S114, the position data of each temperature sensor including the radius and the offset angle, and at least one difference value between the radii or the offset angles of the temperature sensors being greater than a preset dispersion interval.

Specially, the distribution position of each temperature sensor should ensure a certain temperature measuring effect and reduce unnecessary position distribution, so the difference of at least one of the radius or offset angle between the temperature sensors is in a preset dispersion interval.

In order to ensure the overall temperature measuring effect of the temperature sensor and to reduce the use of unnecessary parts and materials as much as possible, the difference value between the radii or the offset angles of the temperature sensors should not be too small, which will cause the location distribution to be too dense and will cause duplicate data. When the difference value between the radii or the offset angles of the temperature sensors is in a preset dispersion interval, it means that when performing position distribution, if only one parameter is adjusted (for example, if position distribution is performed in the form of concentric circles, when setting the distribution points on a circle, the radius does not change and only the offset angle is adjusted), it is necessary to ensure that the adjusted parameters meet the position difference conditions of each distribution point, and if two parameters are simultaneously adjusted, the two parameters need to satisfy the difference condition at the same time. Meanwhile, it should not be too large, which results in too few valid data to accurately calculate.

Further, according to an embodiment of the present disclosure, operation S20 includes:

Operation S21, obtaining top three maximum values from the temperature data, and calculating the actual position of the container to be measured on the microcrystal panel according to the position data of the temperature sensor and a corresponding mathematical relationship.

Specially, according to the three maximum temperature values (minimum three) obtained from the temperature data, combined with the position data of three points and the mathematical relationship, the actual position of the container to be measured on the microcrystal panel is calculated.

The closer the temperature sensor is to the bottom of the container to be measured, the higher the value of the measured temperature data. Therefore, the maximum value of the temperature data can be regarded as the temperature data when the temperature sensor is at the bottom of the container to be measured. The actual position of the container to be measured is calculated according to the position data of the three temperature sensors that have measured the maximum temperature (A circle can be obtained by knowing the position of three points on the circle in mathematics. The bottom of the container to be measured is a circle as a whole. The temperature sensor that measures the maximum temperature can be regarded as a point on the circumference. After getting three points, a circle can be obtained, that is, the position of the container to be measured.). In the present disclosure, through the limited amount of data and the corresponding mathematical relationship, the actual position of the container to be measured can be obtained more accurately, the calculation is fast, and the result is accurate.

Figure 4:
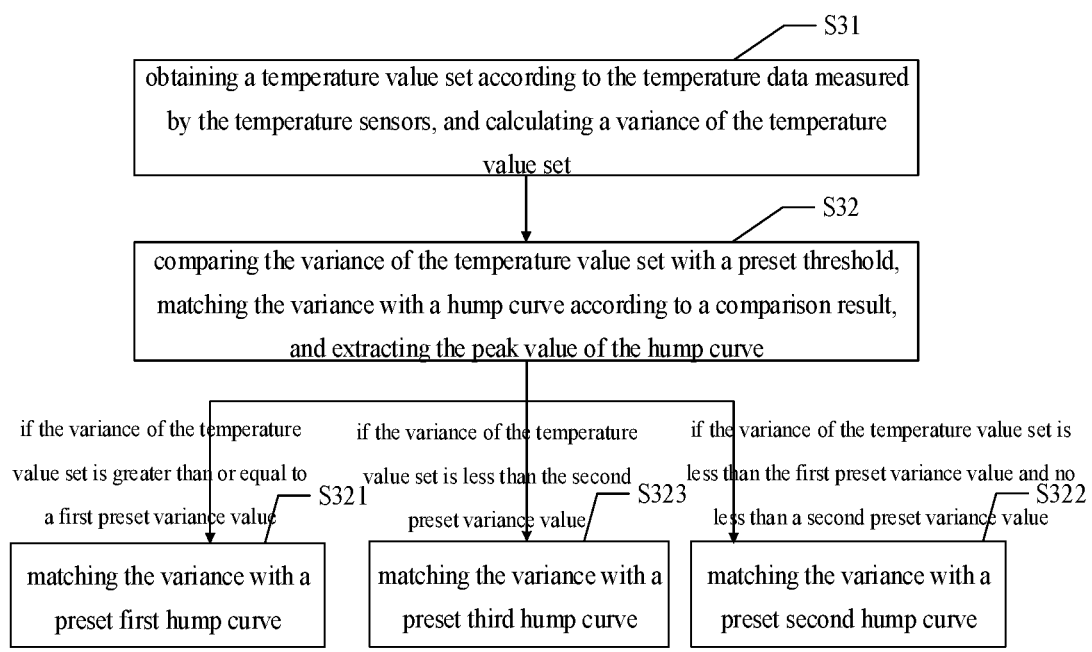
FIG. 4 is a detailed flowchart of operation S30 of the temperature measuring method for the induction cooker according to another embodiment of the present disclosure.

Further, as shown in FIG. 4, according to an embodiment of the present disclosure, operation S30 includes:

Operation S31, obtaining a temperature value set according to the temperature data measured by the temperature sensors, and calculating a variance of the temperature value set; and Operation S32, comparing the variance of the temperature value set with a preset threshold, matching the variance with a hump curve according to a comparison result, and extracting the peak value of the hump curve.

Specially, the temperature data measured by the temperature sensor is combined into a temperature value set, and the variance of the temperature value set is calculated for subsequent calculation. The calculated variance is compared with a preset variance value, the corresponding hump curve is obtained through the comparison result, and the peak value of the hump curve is extracted according to the temperature data.

A set of the temperature data measured by the temperature sensor is a temperature vector (specially, the temperature vector is $[T_1, T_2 \ldots T_{N-1}, T_N]$). First the variance of the temperature vector is calculated, and the value of the variance is the degree of dispersion of each temperature. According to the position of the container to be measured on the microcrystal panel, the temperature data measured by each temperature sensor will also be different (the temperature measured by the temperature sensor at the bottom of the container to be measured is in contact with the microcrystal panel. Due to the air gap, the temperature measured at the center of the container to be measured is lower than the temperature measured at the position which is in contact with the bottom of the container, and the temperature of the edge of the pot is the lowest), so the degree of dispersion of the temperature vector will also be different (when in the center position, there are many points in contact with the bottom of the container to be measured, so the dispersion is low). By comparing the variance with a preset variance value, a hump curve matching the variance is obtained, and then the peak data of the hump curve is obtained through the hump curve and temperature data, and the peak data of the hump curve is the temperature at the bottom of the container to be measured.

The corresponding hump curve is matched according to the variance, and the hump curve is a dot matrix curve of temperature data. Because the number of temperature data is limited, it is not always possible to measure data at the peak of the hump curve, so the peak data is obtained based on the temperature data and the matching hump curve. (The hump curve is similar to a function formula, and there are two peak data, and the temperature data are the points in the function, and the peak value of the function is calculated by the function formula and the points in the function). The temperature of the bottom of the container to be measured can be obtained more accurately by performing a series of calculations such as calculating the variance of the temperature data.

Further, as shown in FIG. 4, operation S32, the operation of "comparing the variance of the temperature value set with a preset threshold, matching the variance with a hump curve according to a comparison result, and extracting the peak value of the hump curve" includes:

Operation S321, matching the variance with a preset first hump curve if the variance of the temperature value set is greater than or equal to a first preset variance value;

Operation S322, matching the variance with a preset second hump curve if the variance of the temperature value set is less than the first preset variance value and no less than a second preset variance value; and Operation S323, matching the variance with a preset third hump curve if the variance of the temperature value set is less than the second preset variance value, wherein the first preset variance value is greater than the second preset variance value.

Specially, after calculating the variance of the temperature vector, comparing the variance with a preset first threshold and a preset second threshold, the corresponding hump curve is matched through the comparison result. After the hump curve is matched, the peak of the hump curve is obtained. The first preset variance value is greater than the second preset variance value.

After the variance of the temperature vector is obtained, the variance is compared with a preset first threshold and a second threshold (the threshold value and number are set according to the actual situation. However, in practice, it is not limited to two preset thresholds. The description is concise and fast. Take two thresholds as an example), to determine a hump curve matching the temperature vector. The hump curve is a dot matrix curve contributed by the temperature data measured by the temperature sensor.

The calculated temperature vector variance is compared with a preset threshold, and a hump curve is matched according to the result of the comparison. There are three kinds of hump curves in the present disclosure, so there are three corresponding comparison situations, which are: If the variance of the temperature vector is greater than the first preset threshold and greater than or equal to the second preset threshold, a preset second hump curve is used for matching. If the variance of the temperature vector is less than the second preset threshold, a preset third hump curve is used for matching by default. The first preset threshold is greater than the second preset threshold. The matching of the hump curve is very important. According to the characteristics of the hump curve and the temperature data, the maximum value of the temperature vector is calculated. (You can understand the hump curve as a function formula, and the corresponding curve is matching a specific function formula. For example, a binary linear function, $y=kx+b$. Although this function is known to be a straight line, it is still necessary to determine the values of the two coefficients k and b to determine the specific graph of the function) The actual temperature of the container to be measured can be finally calculated according to the obtained maximum value. Therefore, by comparing with the preset threshold, the temperature vector can be accurately matched with the hump curve.

Further, according to an embodiment of the present disclosure, operation S40 includes:

Operation S41, calculating the actual temperature of the container to be measured according to the actual position and the peak value, and obtaining a preset temperature correction coefficient corresponding to the actual temperature; and calculating the actual temperature of the container to be measured according to the peak value and the preset temperature correction coefficient.

Specially, query the corresponding data table according to the actual location of the container to be measured to obtain the temperature correction coefficient for the location, and then obtain the actual temperature of the container to be measured according to the peak data and the obtained temperature correction coefficient.

After obtaining the actual position of the container to be measured, the temperature correction coefficient of the corresponding position needs to be obtained by querying the corresponding data table. The temperature correction factor is used to calculate the actual temperature along with the maximum value of the hump curve. After obtaining the temperature correction coefficient, the actual temperature can be obtained from the obtained peak data and temperature correction coefficient according to the corresponding calculation method. The calculation formula is $T'=\delta_1 T_{m1}+\delta_2 T_{m2}$. $d_1$ and $d_2$ are temperature correction factor, $T_{m1}$ and $T_{m2}$ are the peak of the hump curve. The calculation process is concise and the amount of data is small. Therefore, the calculation process is fast and the accuracy is high, so that the user can quickly obtain the required data.

The present disclosure further provides a temperature measuring device based on the temperature measuring method for the induction cooker.

The device includes a memory, a processor, a temperature measuring program for an induction cooker stored on the memory and executable on the processor, the program, when executed by the processor, implements the operations as described above.

The method may refer to various embodiments as described above when the temperature measuring program for the induction cooker stored on the memory, and details are not described herein again.

The present disclosure also provides a computer readable storage medium.

The computer readable storage medium stores a temperature measuring program for an induction cooker, the program, when executed by a processor, implements the operations as described above.

The method may refer to various embodiments as described above when the temperature measuring program for the induction cooker stored on the memory, and details are not described herein again.

It should be noted that, as used herein, the terms "including", "comprising" or any other variation thereof are intended to encompass non-exclusive inclusion such that a process, method, article, or system that includes a series of elements includes not only those elements, and also includes other elements not explicitly listed, or elements inherent to such a process, method, article, or system. Without more restrictions, an element limited by the sentence "including a . . . " does not exclude the existence of other identical elements in the process, method, article, or system that includes the element.

The sequence numbers of the foregoing embodiments of the present disclosure are only for description, and do not represent the superiority or inferiority of the embodiments.

Through the description of the above embodiments, those skilled in the art can clearly understand that the method in the foregoing embodiments can be implemented by means of software plus a necessary universal hardware platform, and of course it can also be implemented by hardware, but in many cases the former is a better implementation. Based on such an understanding, the technical solution of the present disclosure in essence or a part that contributes to the existing technology can be embodied in the form of a software product. The computer software product is stored on a storage medium (such as ROM/RAM, magnetic disk, optical disk) as described above, and includes several instructions to enable a terminal device (which may be a mobile phone, a computer, a server, an air conditioner, or a network device, etc.) to execute the methods described in the embodiments of the present disclosure.

The above are only preferred embodiments of the present disclosure, and thus do not limit the scope of the present disclosure. Any equivalent structure or equivalent process transformation made by using the description and drawings of the present disclosure is included in the scope of the present disclosure.

What is claimed is:

1. A temperature measuring method for an induction cooker, the induction cooker comprising a microcrystal panel and at least three temperature sensors scattered on a bottom surface of the microcrystal panel, the induction cooker being configured to heat a container to be measured, the method comprising the following operations:
   obtaining temperature data collected by the at least three temperature sensors and position data of each temperature sensor relative to the microcrystal panel;
   obtaining an actual position of the container to be measured on the microcrystal panel according to the temperature data and the position data;
   obtaining a preset temperature curve matching the induction cooker according to the temperature data, and extracting a peak value of the preset temperature curve; and
   calculating an actual temperature of the container to be measured according to the actual position and the peak value.

2. The method of claim 1, wherein the microcrystal panel being internally provided with a magnetic flux line, before the operation of "obtaining temperature data collected by the at least three temperature sensors and position data of each temperature sensor relative to the microcrystal panel", the method further comprises:
   determining the position data of each temperature sensor scattered on the bottom surface of the microcrystal panel of the induction cooker according to a coverage area of magnetic flux lines in the microcrystal panel of the induction cooker and number of temperature sensors.

3. The method of claim 2, wherein determining the position data of each temperature sensor scattered on the bottom surface of the microcrystal panel of the induction cooker according to a coverage area of magnetic flux lines in the microcrystal panel of the induction cooker and number of temperature sensors further comprises:
   determining a standard arc length of the temperature sensors spirally or concentrically distributed according to the coverage area of the magnetic flux lines in the microcrystal panel of the induction cooker and number of temperature sensors;
   determining a radius of each of the temperature sensors spirally or concentrically distributed according to an initial radius, an initial angle and the standard arc length of each of the temperature sensors spirally or concentrically distributed; and determining an offset angle of each temperature sensor from the initial angle according to the calculated radius and the standard arc length of each temperature sensor, and using the radius and the offset angle of each temperature sensor as the position data of each temperature sensor scattered on the bottom surface of the microcrystal panel of the induction cooker.

4. The method of claim 3, wherein the position data of each temperature sensor comprises the radius and the offset angle, and at least one difference value between the radii or the offset angles of the temperature sensors is greater than a preset dispersion interval.

5. The method of claim 1, wherein obtaining an actual position of the container to be measured on the microcrystal panel according to the temperature data and the position data comprises:

obtaining top three maximum values from the temperature data, and calculating the actual position of the container to be measured on the microcrystal panel according to the position data of the temperature sensor and a corresponding mathematical relationship.

6. The method of claim 1, wherein obtaining a preset temperature curve matching the induction cooker according to the temperature data, and extracting a peak value of the preset temperature curve comprises:

obtaining a temperature value set according to the temperature data measured by the temperature sensors, and calculating a variance of the temperature value set; and comparing the variance of the temperature value set with a preset threshold, matching the variance with a hump curve according to a comparison result, and extracting the peak value of the hump curve.

7. The method of claim 6, wherein comparing the variance of the temperature value set with a preset threshold, matching the variance with a hump curve according to a comparison result, and extracting the peak value of the hump curve comprises:

matching the variance with a preset first hump curve if the variance of the temperature value set is greater than or equal to a first preset variance value;

matching the variance with a preset second hump curve if the variance of the temperature value set is less than the first preset variance value and no less than a second preset variance value; and matching the variance with a preset third hump curve if the variance of the temperature value set is less than the second preset variance value, wherein the first preset variance value is greater than the second preset variance value.

8. The method of claim 1, wherein calculating an actual temperature of the container to be measured according to the actual position and the peak value comprises:

calculating the actual temperature of the container to be measured according to the actual position and the peak value, and obtaining a preset temperature correction coefficient corresponding to the actual temperature; and calculating the actual temperature of the container to be measured according to the peak value and the preset temperature correction coefficient.

9. A temperature measuring device, comprising a memory, a processor, a temperature measuring program for an induction cooker stored on the memory and executable on the processor, the induction cooker comprising a microcrystal panel and at least three temperature sensors scattered on a bottom surface of the microcrystal panel, the induction cooker being configured to heat a container to be measured, and the program including instructions that, when executed by the processor, cause performance of operations comprising:

obtaining temperature data collected by the at least three temperature sensors and position data of each temperature sensor relative to the microcrystal panel;

obtaining an actual position of the container to be measured on the microcrystal panel according to the temperature data and the position data;

obtaining a preset temperature curve matching the induction cooker according to the temperature data, and extracting a peak value of the preset temperature curve; and calculating an actual temperature of the container to be measured according to the actual position and the peak value.

10. The device of claim 9, wherein the operations further include:

determining the position data of each temperature sensor scattered on the bottom surface of the microcrystal panel of the induction cooker according to a coverage area of magnetic flux lines in the microcrystal panel of the induction cooker and number of temperature sensors.

11. The device of claim 9, wherein the operations further include:

determining a standard arc length of the temperature sensors spirally or concentrically distributed according to the coverage area of the magnetic flux lines in the microcrystal panel of the induction cooker and number of temperature sensors;

determining a radius of each of the temperature sensors spirally or concentrically distributed according to an initial radius, an initial angle and the standard arc length of each of the temperature sensors spirally or concentrically distributed; and determining an offset angle of each temperature sensor from the initial angle according to the calculated radius and the standard arc length of each temperature sensor, and using the radius and the offset angle of each temperature sensor as the position data of each temperature sensor scattered on the bottom surface of the microcrystal panel of the induction cooker.

12. The device of claim 9, wherein the operations further include:

obtaining top three maximum values from the temperature data, and calculating the actual position of the container to be measured on the microcrystal panel according to the position data of the temperature sensor and a corresponding mathematical relationship.

13. The device of claim 9, wherein the operations further include:

obtaining a temperature value set according to the temperature data measured by the temperature sensors, and calculating a variance of the temperature value set; and comparing the variance of the temperature value set with a preset threshold, matching the variance with a hump curve according to a comparison result, and extracting the peak value of the hump curve.

14. The device of claim 9, wherein the operations further include:

calculating the actual temperature of the container to be measured according to the actual position and the peak value, and obtaining a preset temperature correction coefficient corresponding to the actual temperature; and calculating the actual temperature of the container to be measured according to the peak value and the preset temperature correction coefficient.

15. A non-transitory computer readable storage medium, wherein the computer readable storage medium stores a temperature measuring program for an induction cooker, the induction cooker comprising a microcrystal panel and at least three temperature sensors scattered on a bottom surface of the microcrystal panel, the induction cooker being configured to heat a container to be measured, and the program includes instructions that, when executed by a processor, cause performance of operations comprising:

obtaining temperature data collected by the at least three temperature sensors and position data of each temperature sensor relative to the microcrystal panel;

obtaining an actual position of the container to be measured on the microcrystal panel according to the temperature data and the position data;

obtaining a preset temperature curve matching the induction cooker according to the temperature data, and extracting a peak value of the preset temperature curve; and calculating an actual temperature of the container to be measured according to the actual position and the peak value.

16. The non-transitory computer readable storage medium of claim 15, wherein the operations further include:

determining the position data of each temperature sensor scattered on the bottom surface of the microcrystal panel of the induction cooker according to a coverage area of magnetic flux lines in the microcrystal panel of the induction cooker and number of temperature sensors.

17. The non-transitory computer readable storage medium of claim 15, wherein the operations further include:

determining a standard arc length of the temperature sensors spirally or concentrically distributed according to the coverage area of the magnetic flux lines in the microcrystal panel of the induction cooker and number of temperature sensors; determining a radius of each of the temperature sensors spirally or concentrically distributed according to an initial radius, an initial angle and the standard arc length of each of the temperature sensors spirally or concentrically distributed; and determining an offset angle of each temperature sensor from the initial angle according to the calculated radius and the standard arc length of each temperature sensor, and using the radius and the offset angle of each temperature sensor as the position data of each temperature sensor scattered on the bottom surface of the microcrystal panel of the induction cooker.

18. The non-transitory computer readable storage medium of claim 15, wherein the operations further include:

obtaining top three maximum values from the temperature data, and calculating the actual position of the container to be measured on the microcrystal panel according to the position data of the temperature sensor and a corresponding mathematical relationship.

19. The non-transitory computer readable storage medium of claim 15, wherein the operations further include:

obtaining a temperature value set according to the temperature data measured by the temperature sensors, and calculating a variance of the temperature value set; and comparing the variance of the temperature value set with a preset threshold, matching the variance with a hump curve according to a comparison result, and extracting the peak value of the hump curve.

20. The non-transitory computer readable storage medium of claim 15, wherein the operations further include:

calculating the actual temperature of the container to be measured according to the actual position and the peak value, and obtaining a preset temperature correction coefficient corresponding to the actual temperature; and calculating the actual temperature of the container to be measured according to the peak value and the preset temperature correction coefficient.

* * * * *